United States Patent [19]

Kennedy et al.

[11] Patent Number: 5,465,832
[45] Date of Patent: Nov. 14, 1995

[54] CARD READER CASE

[75] Inventors: James K. Kennedy, Round Rock, Tex.; James A. Wilson, North St. Paul, Minn.

[73] Assignee: Minnesota Mining and Manufacturing Company, St. Paul, Minn.

[21] Appl. No.: 147,831

[22] Filed: Nov. 12, 1993

[51] Int. Cl.⁶ .................................................. B65D 85/30
[52] U.S. Cl. ................................ 206/45.23; 206/425
[58] Field of Search ............................ 206/45.23, 45.2, 206/45.14, 45.13, 573, 328, 425, 449, 454, 455, 456; 220/521, 522

[56] References Cited

U.S. PATENT DOCUMENTS

| | | | |
|---|---|---|---|
| 735,681 | 8/1903 | Stonebridge | 206/573 X |
| 801,067 | 10/1905 | Ferris | 206/449 X |
| 1,930,347 | 10/1933 | Meyer et al. | 206/45.23 |
| 1,939,824 | 12/1933 | Mix et al. | 206/45.23 |
| 2,633,655 | 8/1945 | Langan | 40/158 |
| 2,889,036 | 6/1959 | Davies | 206/449 X |
| 3,647,076 | 3/1972 | Heimann | 206/449 X |
| 4,994,987 | 2/1991 | Baldwin | 364/518 |
| 5,001,696 | 3/1991 | Baldwin | 364/521 |
| 5,233,171 | 8/1993 | Baldwin | 235/467 |

OTHER PUBLICATIONS

The following U.S. patent application Ser. Nos. are related cases: 07/861,067, 08/148,571 and 08/159,734.

*Primary Examiner*—Jacob K. Ackun
*Attorney, Agent, or Firm*—Gary L. Griswold; Walter N. Kirn; Jack V. Musgrove

[57] ABSTRACT

A card reader which doubles as a carrying case for storing a stack of preview cards used in an electronic presentation. The card reader case has a flat, rectangular body housing the reader components, and a cover hingedly attached to the body, the cover having a pocket therein for storing the cards. The cover is attached in such a manner that the topmost of the stored cards is visible when the cover is in the open position. In this position, the lower end of the cover also serves to support and elevate one end of the body. The body further has a slot therein on its upper surface for retaining one of the cards for optical scanning, the scanned card extending away from the upper surface so as to be visible to the user during scanning. A discard area may also be formed on the upper surface of the body, and a light source may be positioned on the upper surface to illuminate any card retained in the slot. If the card reader utilized a remote (wireless) interface, the interface may be attached to the upper portion of the cover so that the interface is raised above other objects on the support surface when the device is in use.

16 Claims, 3 Drawing Sheets

CARD READER CASE

BACKGROUND OF THE INVENTION

1. Field of the Invention

The present invention generally relates to devices for storing and displaying thin substrates such as cards, and more particularly to a compact, tabletop card case for storing, displaying, and operatively receiving preview cards having human-readable information and machine-readable information, the card case also housing the card reader.

2. Description of the Prior Art

The present invention is directed to certain improvements on the Image Access System (IAS) electronic presentation system for displaying stored images, as disclosed in U.S. Pat. Nos. 4,994,987, 5,001,696 and 5,233,171, and in U.S. patent application Ser. No. 07/861,067. The terms "Image Access System" and "IAS" are trademarks of Minnesota Mining and Manufacturing Co. (3M-assignee of the present invention).

The IAS system requires a substrate, such as a preview card, which contains human-readable information (an illustration or textual description) associated with a stored image, and machine-readable information associated with the location of the stored image, e.g., a software address on a medium separate from the card, such as a computer diskette. One embodiment of the IAS system includes a card reader which supports the card in such manner that it may be viewed by the user and simultaneously scanned by the reader to allow decryption of the machine-readable information. While the prior art card reader/holder is adequate for operating the IAS system, it has been found lacking in certain other desiderata. For example, it does not allow for the storage of cards during transportation, meaning that a separate article is required to retain the preview card in an organized manner (i.e., in the proper order, facing the proper direction, and at the proper orientation). It also does not address retention of the cards while they are not being scanned. It would, therefore, be desirable to overcome the foregoing limitations by devising a card reader which may double as a carrying case for the cards, without adding undue complexity to the mechanical design of the reader, and without adversely affecting the aesthetic appearance of the unit. It would be further advantageous to design a more compact reader, and one which is also ergonomically designed to retain and display the cards during the presentation.

SUMMARY OF THE INVENTION

The present invention provides a case for a card reader, the case comprising a generally flat, rectangular body which houses the electronic components for an optical bar code reader, and a generally flat, rectangular cover attached to the body, the cover having means for storing thin cards therewith. In the preferred embodiment, the storing means comprises a pocket formed at one end of the cover, the pocket defining a lip which is hinged to an end of the body. In this manner, the cover may be moved from a closed position, in which the cover overlaps the body and retains (in the pocket) a plurality of preview cards, to an open position in which the preview cards, still held in the pocket, are raised to an orientation which facilitates viewing and manipulation. The cards may be further secured in the pocket by, e.g., a spring-loaded tab or clip.

The body includes means for removably retaining one of the cards proximate to the optical bar code reader (located inside the body). In the preferred embodiment, the retaining means comprises a slot formed in the upper surface of the body, the slot being sufficiently long to receive an edge of a card. The slot is deep enough to support the card in a direction extending away from the body.

The hinged movement of the cover may be limited such that, in the open position, the lower end of the cover (i.e., the bottom of the pocket) serves as a support to incline the body, facilitating manual actuation of buttons, switches, etc., which are located on the upper surface of the body. The upper surface of the body may have a generally flat "discard" area along that portion of the body which overlaps the cover when closed. A light may also be provided to illuminate any card placed in the reader slot, since these types of presentations often occur in darkened rooms to enhance images which are projected onto a screen.

If the card reader is designed for remote (wireless) operation, then the remote interface (e.g., transmitter/receiver antenna or sensor) may be attached to the upper end of the cover so that, during use, it is raised slightly above other objects on the tabletop or other surface supporting the body.

BRIEF DESCRIPTION OF THE DRAWINGS

The invention will best be understood by reference to the accompanying drawings, wherein.

DESCRIPTION OF THE PREFERRED EMBODIMENT

Figure 1:
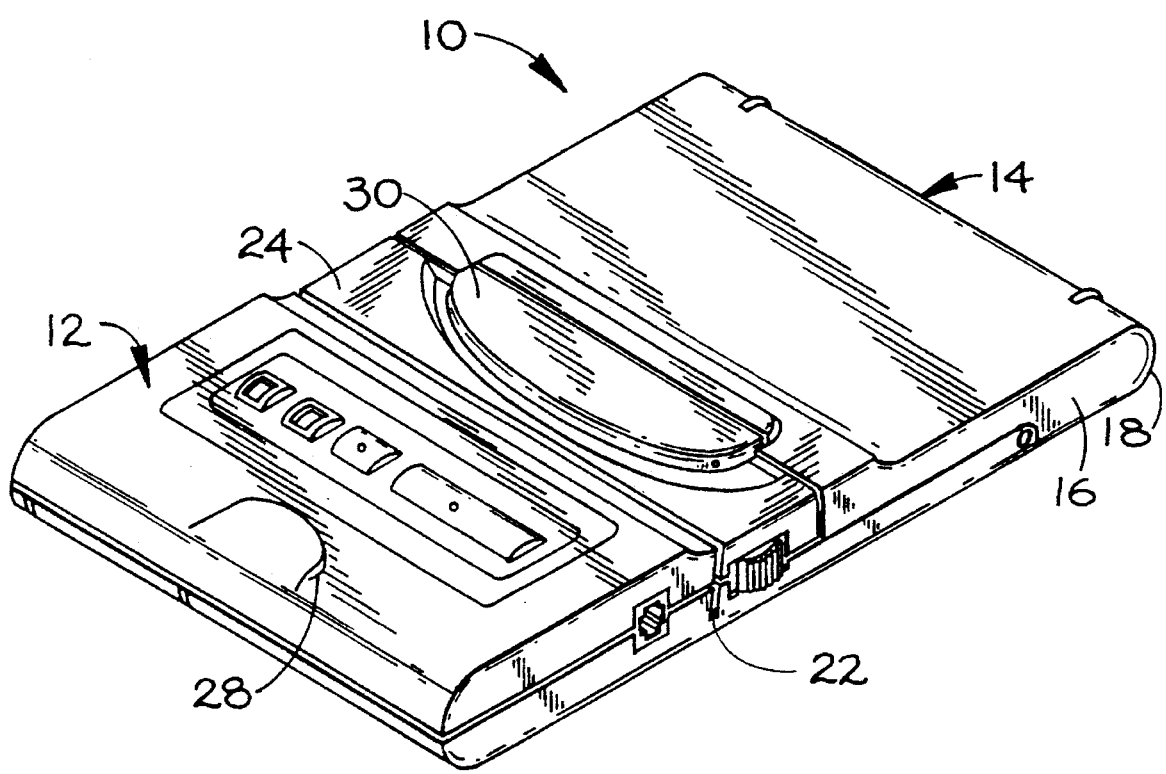
FIG. 1 is a perspective view of one embodiment of the card reader case of the present invention, shown in the closed position.

With reference now to the figures, and in particular with reference to FIG. 1, there is depicted one embodiment 10 of the card reader case of the present invention, shown in its closed position. This invention is particularly suited for use with the Image Access System (IAS) presentation system disclosed in U.S. Pat. Nos. 4,994,987, 5,001,696 and 5,233,171, and in U.S. patent application Ser. No. 07/861,067, each of which is incorporated by reference. The IAS system uses thin preview cards which have, among other things, machine-readable information thereon, associated with the location of stored images which may be retrieved and displayed electronically. The presently preferred embodiment contemplates the use of an optical bar code placed on a transparent window in the preview card (as more fully disclosed in U.S. patent application Ser. No. 08/148,571, the encoded information being indicative of the address on a computer diskette where the image is magnetically or optically stored. The present invention is not, however, directed to the form of the machine encoding or the nature of the reader, but is rather directed to the mechanical aspects of case 10 as they relate to its ergonomics and to the viewing and physical manipulation of the preview cards. Accordingly, those skilled in the art will appreciate the optical bar code constitutes but one kind of machine encoding, and the present invention may be used with alternative readers, such as those suggested in the prior art IAS patents (magnetic or mechanical encoding).

Figure 3:
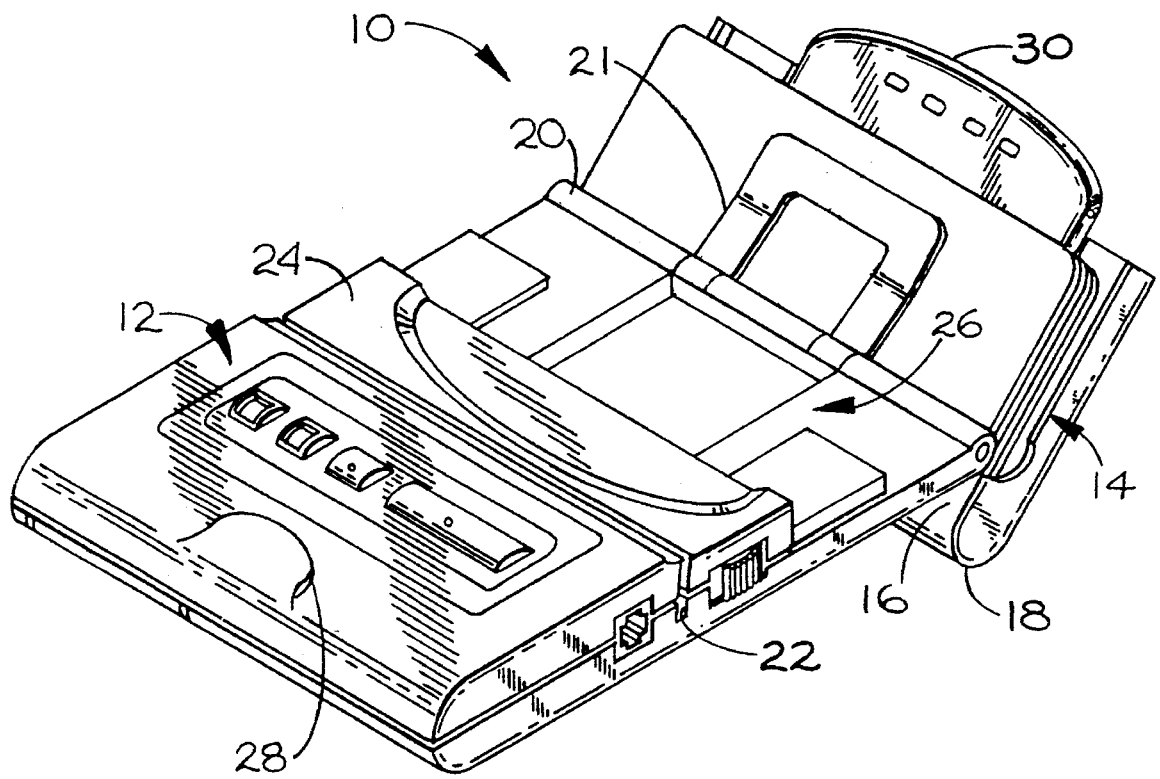
FIG. 3 is a perspective view of the card reader case of FIG. 1, shown with the cover in the open position.
Figure 2:
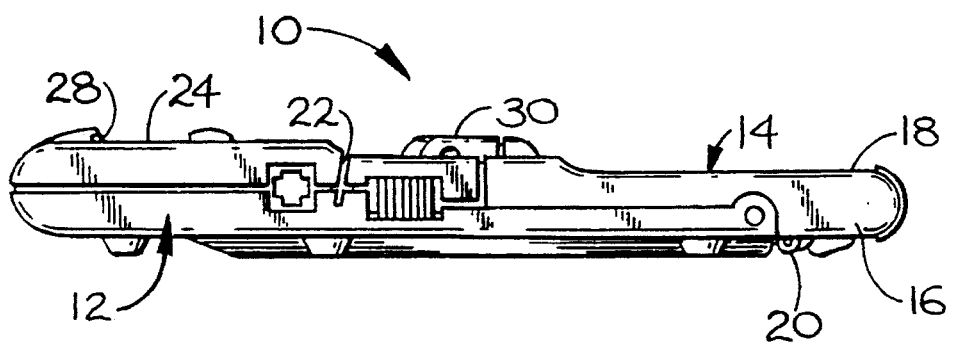
FIG. 2 is a right side elevational view of the card reader case of FIG. 1, also shown in the closed position.
Figure 5:
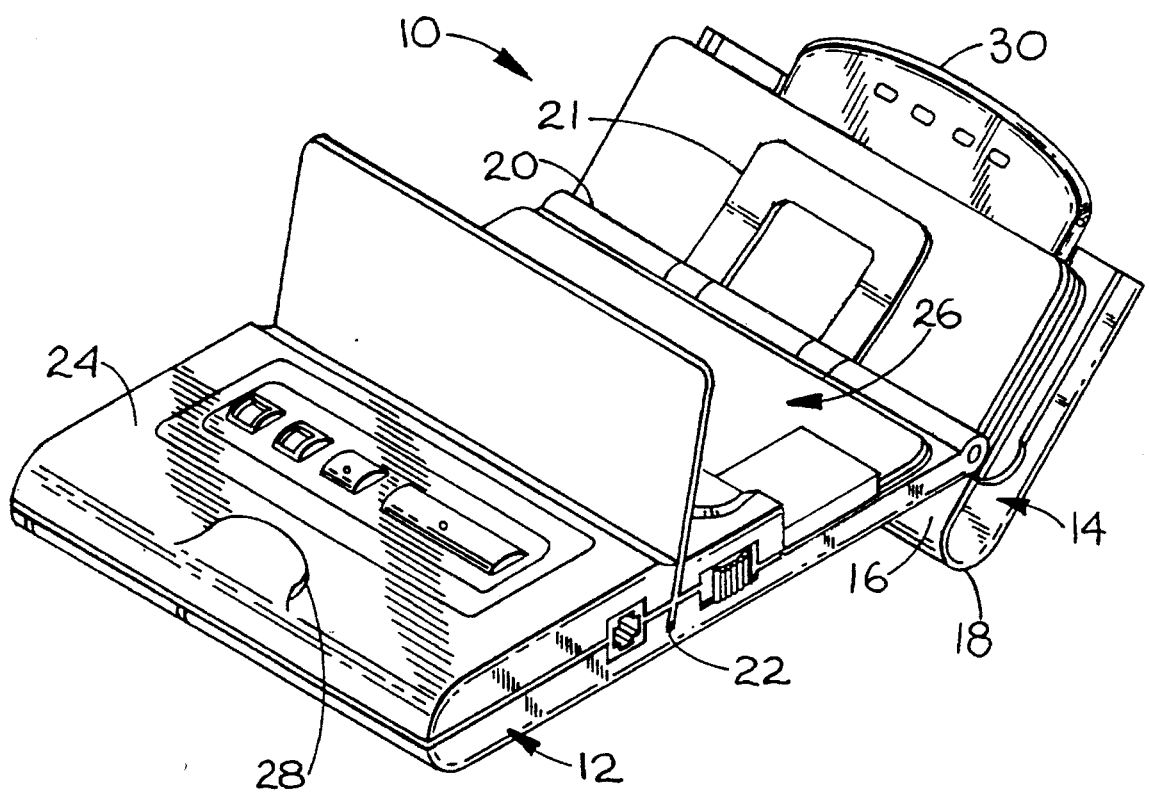
FIG. 5 is a perspective view of the card reader case of FIG. 1, depicting placement of the preview cards in their storage, use and discard locations.
Figure 4:
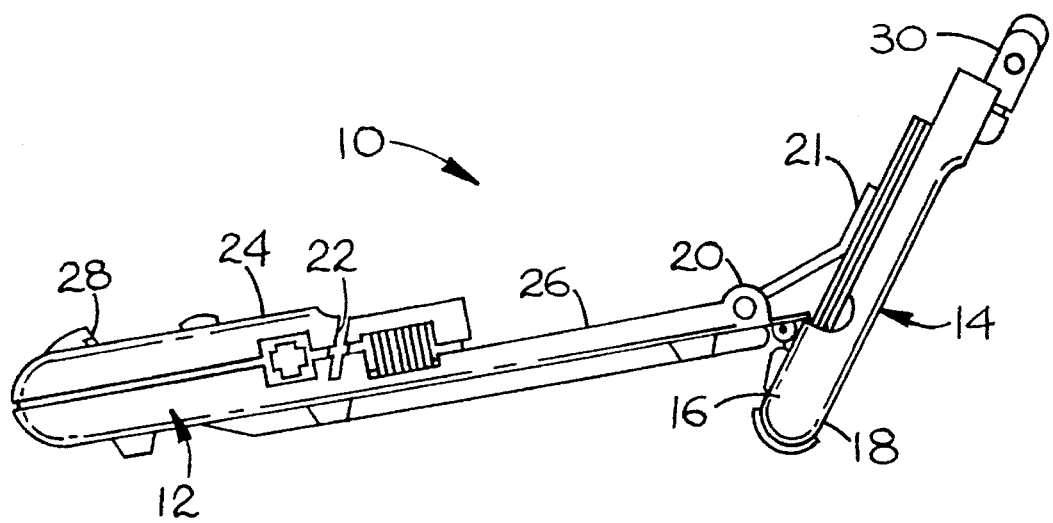
FIG. 4 is a right side elevational view of card reader case of FIG. 1, shown with the cover in the open position.

Case 10 is comprised of a generally flat, rectangular body 12, and a generally flat, rectangular cover 14 attached to body 12, movable between a closed position (FIGS. 1 and 2) and an open position (FIGS. 3, 4 and 5). Body 12 and cover 14 may be constructed of any durable material, preferably a polymer such as polycarbonate. Body 12 houses the electronic components for the optical bar code reader (or other type of reader). The invention provides means for storing the cards with the cover, in stacked relationship, such that a top one of the stacked cards may be viewed during use. In the preferred embodiment, the storing means comprises a pocket 16 formed transversely along one end 18 of cover 14, pocket 16 defining an edge or lip 20 which is hinged to one end of body 12. The cards may be further secured by, e.g., a spring-loaded clip or tab 21. Since cover 14 is effectively hinged intermediate its ends to an edge of body 12, when cover 14 is in the closed position, it overlaps body 12, thereby enhancing the compact nature of case 10, but it still retains (in pocket 16) a plurality of the preview cards; when it is in the open position, the preview cards (still held in pocket 16) are raised to an orientation such that the top card is easily visible (see FIG. 5). The cards are preferably stacked in the order of the presentation, with the beginning cards at the top of the stack, and the ending cards at the bottom, so that the next card in the presentation is always visible in pocket 16. The hinged movement of cover 14 may be limited such that, in the open position, lower end 18 (i.e., the bottom of the pocket) serves as a support to incline body 12 toward the user, facilitating manual actuation of buttons, switches, etc., which are located on the upper surface of the body. In this position, the lower end of the cover preferably forms an acute interior angle with body 12.

Body 12 includes means for removably retaining one of the cards proximate to the optical bar code reader. In the preferred embodiment, the retaining means comprises a slot 22 formed in the upper surface 24 of body, the slot being sufficiently long to receive an edge of a card. The slot is preferably tapered to more properly seat the card, and is deep enough to support card in a direction extending away from the body so that the card being scanned is likewise easily visible. The preferred reader, which is beyond the scope of the present invention, is that more fully disclosed in U.S. patent application Ser. No. 08/159,734. That reader includes an array of light emitting diodes which direct light toward the transparent film window on the preview card, and a MOS sensor on the opposite side of the window which detects the shadow of the marks forming the bar code which is printed on the window.

Upper surface 24 of body 12 may have a generally flat "discard" area 26 along that portion of body 12 which overlaps cover 14 when closed. A light 28 may also be provided on body 12 to illuminate any card placed in reader slot 22, since these types of presentations often occur in darkened rooms to enhance images which are projected onto a screen, for example, using a liquid crystal display panel mounted on the stage of an overhead projector.

If the card reader is designed for remote (wireless) operation, then the remote interface 30 for the reader (e.g., a conventional transmitter/receiver antenna or sensor) may be attached to the upper end 32 of cover 14 so that, during use, remote interface 30 is raised slightly above other objects on the tabletop or other surface supporting body 12.

Operation of card reader 10 is relatively simple and greatly enhances the effectiveness of any visual presentation. Far in advance of the presentation, the presenter prepares the preview cards and image files in accordance with U.S. Pat. No. 5,001,696. The cards may be stacked in any order desired and placed in pocket 16, where they may be stored indefinitely. After the hardware associated with the presentation is setup (e.g., an overhead projector with a liquid crystal display panel and computer), cover 14 is opened and card reader 10 placed on the presenter's podium or table; means may be provided to automatically turn on the opto-electronic components associated with the reader when cover 14 is opened. If a wireless interface is not being used, it will also be necessary to connect reader 10 to the system controller (computer). The presenter then selects any card (usually the top card in the stack) from pocket 16, and places it in slot 22. The reader and associated hardware then locate, retrieve and display the particular graphic image corresponding to the specific bar code printed on the card. The card being scanned (in slot 22) as well as the next card in the presentation (the succeeding top card in pocket 16) are both visible to the presenter, facilitating flow of the presentation. When another card is to be scanned, the prior card in slot 22 is first removed and placed in the discard area 26. The cards may be placed face up on area 26 to facilitate retrieval of previously viewed cards.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A device for storing and displaying a generally planar substrate, comprising:

a generally planar body having a first end;

a cover member attached to said body at said first end thereof and movable between an open position and a closed position, said cover member having an upper portion which overlaps said first end of said body when said cover member is in said closed position, and a lower portion which extends away from said body when said cover member is in said open position such that said lower portion elevates said first end of said body when the device is placed on a support surface, electronic means for remotely interfacing with an external apparatus, said interfacing means being attached to said cover member at said upper portion thereof; and means for storing a plurality of the substrates in stacked relationship with said cover member such that a top one of the substrates is visible when said cover member is in said open position.

2. The device of claim 1 further comprising means, located on an upper surface of said body, for removably retaining one the substrates such that the substrate generally extends away from said body.

3. The device of claim 1 wherein said body and said cover member are both generally rectangular.

4. The device of claim 1 wherein said storing means includes a pocket formed in said cover member at a first end thereof.

5. The device of claim 1 further comprising tab means attached to said cover member for forcibly urging any stored substrates against said cover member.

6. The device of claim 2 further comprising means, located on said upper surface of said body, for illuminating the substrate when placed in said retaining means.

7. The device of claim 2 wherein said retaining means comprises a slot formed in said upper surface of said body, said slot being sufficiently long and wide to receive an edge of the substrate.

8. The device of claim 2 wherein said body further has a generally flat area formed on said upper surface thereof, located between said retaining means and said first end of said body, for stackably receiving a plurality of the substrates.

9. The device of claim 1 wherein said lower portion of said cover member forms an acute interior angle with said body when said cover member is in said open position.

10. An apparatus for storing and displaying cards, comprising:

a generally rectangular body having first and second ends, an upper surface, and a slot in said upper surface located between said first and second ends, said slot being sufficiently long to receive an edge of one of the cards, and having a width and depth such that, when a card is fully inserted in said slot, the card is retained in a viewing position extending away from said upper surface of said body, said body further having a generally flat area formed on said upper surface thereof, located between said slot and said first end of said body, for stackably receiving a plurality of the cards; and a generally rectangular cover having upper and lower portions, and a transverse pocket formed at said lower portion, said pocket capable of receiving a plurality of the cards in stacked relationship, and defining an edge, said cover being hingedly attached, at said edge, to said first end of said body, and said cover further being movable between a closed position, wherein said upper portion of said cover overlaps said first end of said body, and an open position, such that cards placed in any of said slot, said flat area and said pocket are simultaneously visible.

11. The apparatus of claim 10 wherein said lower portion of said cover extends away from said body when said cover is in said open position, such that said lower portion elevates said first end of said body when the apparatus is placed on a support surface.

12. The apparatus of claim 10 further comprising tab means attached to said cover for forcibly urging any stored cards against said cover.

13. The apparatus of claim 10 further comprising means, located on said upper surface of said body, for illuminating a card when it is placed in said slot.

14. The apparatus of claim 10 wherein said lower portion of said cover forms an acute interior angle with said body when said cover is in said open position.

15. The apparatus of claim 10 further comprising electronic means for remotely interfacing with an external apparatus, said interfacing means being attached to said upper portion of said cover member.

16. A card reader case for storing a plurality of preview cards and operatively retaining one of the cards in a position for optical scanning, comprising:

a generally rectangular body having first and second ends, an upper surface, and a slot in said upper surface located between said first and second ends, said slot being sufficiently long to receive an edge of one of the cards, and having a width and depth such that, when a card is fully inserted in said slot, the card is retained in a viewing position extending away from said upper surface of said body; and a generally rectangular cover having upper and lower portions, and a transverse pocket formed at said lower portion, said pocket capable of receiving a plurality of the cards in stacked relationship, and defining an edge, said cover being hingedly attached, at said edge, to said first end of said body, and said cover further being movable between a closed position, wherein said upper portion of said cover overlaps said first end of said body, and an open position, wherein a top one of the cards located in said pocket is visible, said lower portion of said cover extending away from said body when said cover is in said open position, such that said lower portion elevates said first end of said body when the apparatus is placed on a support surface, and said lower portion of said cover forming an acute interior angle with said body when said cover is in said open position.;

tab means attached to said cover for forcibly urging any stored cards against said cover;

means, located on said upper surface of said body, for illuminating a card when it is placed in said slot; and electronic means for remotely interfacing with an external apparatus, said interfacing means being attached to said upper portion of said cover member.

\* \* \* \* \*